(12) United States Patent
Son et al.

(10) Patent No.: US 8,334,332 B2
(45) Date of Patent: Dec. 18, 2012

(54) FLAME-RETARDANT THERMOPLASTIC RESIN COMPOSITION WITH EXCELLENT COLOR TONE

(75) Inventors: Se Bum Son, Anyang-si (KR); Sung Hee Ahn, Seoul (KR); In Hwan Oh, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 35 days.

(21) Appl. No.: 12/884,576

(22) Filed: Sep. 17, 2010

(65) Prior Publication Data

US 2011/0160343 A1 Jun. 30, 2011

(30) Foreign Application Priority Data

Dec. 30, 2009 (KR) .................. 10-2009-0133585

(51) Int. Cl.
C08K 3/10 (2006.01)
C08K 5/00 (2006.01)
(52) U.S. Cl. .......................... 524/408; 524/81
(58) Field of Classification Search .................... 524/408
See application file for complete search history.

(56) References Cited

U.S. PATENT DOCUMENTS

| | | | |
|---|---|---|---|
| 4,027,073 A | 5/1977 | Clark | |
| 4,585,818 A * | 4/1986 | Jung et al. ..................... | 524/120 |
| 4,994,515 A | 2/1991 | Washiyama et al. | |
| 5,039,729 A | 8/1991 | Brackenridge et al. | |
| 5,055,235 A | 10/1991 | Brackenridge et al. | |
| 5,290,855 A | 3/1994 | Kodama et al. | |
| 5,635,565 A | 6/1997 | Miyajma et al. | |
| 5,712,336 A | 1/1998 | Gareiss et al. | |
| 5,989,723 A | 11/1999 | Tsai et al. | |
| 6,117,371 A | 9/2000 | Mack | |
| 6,447,913 B1 | 9/2002 | Watanabe et al. | |
| 7,288,587 B2 | 10/2007 | Saitou et al. | |
| 2001/0041772 A1 | 11/2001 | Masubuchi et al. | |
| 2005/0137311 A1 | 6/2005 | Muylem et al. | |
| 2007/0049674 A1* | 3/2007 | Kim et al. ..................... | 524/409 |
| 2008/0088961 A1 | 4/2008 | Kushida | |
| 2008/0160240 A1 | 7/2008 | Son et al. | |
| 2008/0221255 A1 | 9/2008 | Ahn et al. | |
| 2010/0029828 A1 | 2/2010 | Ahn et al. | |
| 2010/0041800 A1 | 2/2010 | Son et al. | |
| 2010/0113648 A1 | 5/2010 | Niessner et al. | |
| 2010/0152342 A1 | 6/2010 | Kong et al. | |
| 2010/0152372 A1 | 6/2010 | Oh et al. | |
| 2010/0168292 A1* | 7/2010 | Son et al. ..................... | 524/114 |
| 2010/0168315 A1 | 7/2010 | Park et al. | |
| 2010/0249314 A1 | 9/2010 | Park et al. | |

FOREIGN PATENT DOCUMENTS

| | | |
|---|---|---|
| EP | 0347116 A2 | 12/1989 |
| EP | 0489912 A1 | 6/1992 |
| EP | 502333 A1 * | 9/1992 |
| EP | 0502333 A1 | 9/1992 |
| JP | 01-163243 A | 6/1989 |
| JP | 01-263149 A | 10/1989 |
| JP | 01-304153 A | 12/1989 |
| JP | 05-295196 A | 11/1993 |
| JP | 05-339479 A | 12/1993 |
| JP | 06-322200 A | 11/1994 |
| JP | 08-311300 A | 11/1996 |
| JP | 10-175893 | 6/1998 |
| JP | 10175893 A * | 6/1998 |
| JP | 2001-139742 | 5/2001 |
| JP | 14-97374 A | 4/2002 |
| JP | 2005-272640 | 10/2005 |
| JP | 18-111787 A | 4/2006 |
| JP | 2006-143955 | 6/2006 |
| JP | 2007-314619 | 12/2007 |
| KR | 10-1991-0000910 A | 1/1991 |
| KR | 910008803 B1 | 10/1991 |
| KR | 10-1994-0026146 A | 12/1994 |
| KR | 159256 B1 | 1/1999 |
| KR | 2003-0056039 A | 7/2003 |
| KR | 10-2004-0022374 A | 3/2004 |
| KR | 2004-0079118 A | 9/2004 |
| WO | 90/15103 A1 | 12/1990 |
| WO | 92/00351 A1 | 1/1992 |
| WO | 2008/082138 A1 | 7/2008 |
| WO | 2009/084808 A1 | 7/2009 |

OTHER PUBLICATIONS

International Search Report in commonly owned International Application No. PCT/KR2007/006833 dated Mar. 25, 2008, pp. 1-2.
Machine Translation of JP 2005-272640A, downloaded from http://www19.ipdl.inpit.go.jp/PA1/cgi-bin/PA1DETAIL, Jun. 23, 2009, pp. 1-13.

(Continued)

*Primary Examiner* — Hui Chin

(74) *Attorney, Agent, or Firm* — Summa, Additon & Ashe, P.A.

(57) ABSTRACT

A flame-retardant thermoplastic resin composition that can have excellent color tone according to the present invention comprises a base resin comprising (A) about 50 to about 99% by weight of a rubber modified aromatic vinyl resin; and (B) about 1 to about 50% by weight of an acryl resin; and further comprising (C) about 1 to about 30 parts by weight of a bromodiphenyl ethane mixture, based on about 100 parts by weight of the base resin comprising (A) and (B); and (D) about 1 to about 10 parts by weight of an antimony oxide, based on about 100 parts by weight of the base resin comprising (A) and (B). The resin composition of the present invention can have improved physical properties and color properties as well as flame resistance.

13 Claims, No Drawings

OTHER PUBLICATIONS

Suzuhiro Chemica Co., Ltd. Product Info 3-1 (Antimony Trioxide [Fire Cut AT38 AT-3CN AT-3LT AT3CN-LP]) Available Online at: http://www.chemical-suzuhiro.co.jp/EN/pdf/e_product-into[AT3]2.0.pdf, pp. 1-3.
Office Action in commonly owned U.S. Appl. No. 11/965,013, mailed on Jul. 1, 2009, pp. 1-18.
Notice of Allowance in commonly owned U.S. Appl. No. 12/512,134 mailed on Mar. 8, 2011, pp. 1-5.
Advisory Action in commonly owned U.S. Appl. No. 11/965,013, mailed on May 7, 2010, pp. 1-9.
International Preliminary Report on Patentability in commonly owned International Application No. PCT/KR2007/006833 dated Jun. 30, 2009, pp. 1-4.
Office Action in commonly owned U.S. Appl. No. 12/037,123, mailed on Jan. 25, 2010, pp. 1-11.
Office Action in commonly owned U.S. Appl. No. 12/037,123, mailed on Jun. 29, 2010, pp. 1-10.
U.S. Patent Office Advisory Action in commonly owned U.S. Appl. No. 12/037,123 mailed Oct. 18, 2010, pp. 1-3.
Chinese Office Action in commonly owned Chinese Application No. 200910166160 dated Nov. 29, 2010, pp. 1-5.
English translation of Chinese Office Action in commonly owned Chinese Application No. 200910166160 dated Nov. 29, 2010, pp. 1-6.
Office Action in commonly owned U.S. Appl. No. 11/965,013, mailed on Jan. 28, 2010, pp. 1-17.
Notice of Allowance in commonly owned U.S. Appl. No. 12/647,620, mailed on Oct. 11, 2011, pp. 1-9.
Notice of Allowance in commonly owned U.S Appl. No. 12/037,123 mailed on Feb. 1, 2011, pp. 1-12.
Notice of Allowance in commonly owned U.S Appl. No. 12/538,266 mailed on Feb. 17, 2011, pp. 1-8.
Office Action in commonly owned U.S. Appl. No. 12/512,134, mailed on Apr. 21, 2010, pp. 1-6.
Office Action in commonly owned U.S. Appl. No. 12/512,134, mailed on Aug. 27, 2010, pp. 1-5.
Office Action in commonly owned U.S. Appl. No. 12/628,258, mailed on Mar. 24, 2011, pp. 1-22.
Office Action in commonly owned U.S. Appl. No. 12/538,266, mailed on Oct. 27, 2010, pp. 1-7.
International Search Report in commonly owned International Application No. PCT/KR2008/006528, dated Jun. 1, 2009, pp. 1-4.
Office Action in commonly owned U.S. Appl. No. 12/647,620, mailed on Jan. 31, 2011, pp. 1-10.
BASF, Joncryl ADR-4370-S, Mar. 13, 2007, pp. 1-9.
Villalobos et al., "Oligomeric chain extenders for economic reprocessing and recycling of condensation plastics," ScineceDirect, Energy 31, 2006, pp. 3227-3234.
Final Office Action in commonly owned U.S. Appl. No. 12/647,601 mailed Aug. 8, 2011, pp. 1-6.
Office Action in commonly owned U.S. Appl. No. 12/647,601 mailed Apr. 21, 2011, pp. 1-11.
Advisory Action in commonly owned U.S. Appl. No. 12/647,601 mailed Nov. 16, 2011, pp. 1-4.
Office Action in commonly owned U.S. Appl. No. 12/797,645 mailed Apr. 22, 2011, pp. 1-11.
Notice of Allowance in commonly owned U.S. Appl. No. 12/797,645 mailed Aug. 19, 2011, pp. 1-6.
Office Action in commonly owned U.S. Appl. No. 12/613,584 mailed Jan. 12, 2012, pp. 1-8.
Final Office Action in commonly owned U.S. Appl. No. 12/628,258, mailed on Sep. 12, 2011, pp. 1-10.
Notice of Allowance in commonly owned U.S. Appl. No. 12/628,258, mailed on Feb. 6, 2012, pp. 1-7.

* cited by examiner

FLAME-RETARDANT THERMOPLASTIC RESIN COMPOSITION WITH EXCELLENT COLOR TONE

CROSS-REFERENCE TO RELATED APPLICATIONS

This application claims priority from Korea Patent Application No. 2009-133585, filed on Dec. 30, 2009, in the Korean Intellectual Property Office, the disclosure of which is incorporated herein by reference in its entirety.

FIELD OF THE INVENTION

The present invention relates to a flame-retardant thermoplastic resin composition.

BACKGROUND OF THE INVENTION

Acrylonitrile-butadiene-styrene (ABS)/polyester blends can have good machinability (workability) and excellent physical properties, such as high impact strength. Accordingly, ABS/polyester blends have been widely used in a variety of applications, including the production of internal or external parts of electric/electronic goods and office equipment. However, ABS/polyester blends can burn when used in heat-emitting devices since ABS/polyester blends are combustible. Further, these blends can operate as an energy source to help combustion if ignited by a flame from an external heat source. For these reasons, legal regulations in many countries, including the United States and the European Union, require that resins used in internal and external components for electric and electronic appliances meet flame resistance standards.

There are many methods for imparting flame retardancy to an ABS copolymer resin. In one widely used method for imparting flame retardancy (which can be referred to as an "addition-type flame retardant method"), an organic compound including halogen atoms, such as bromine or chlorine atoms (called a flame retardant) and an inorganic antimony oxide compound, such as powder antimony trioxide or antimony pentoxide (called a flame retardant aid) is added to a powder-type ABS resin. The mixture can be mechanically mixed by a mixer and extruded thereafter. The flame retardant aid is generally a powder antimony trioxide, which can have excellent flame retardant effects.

Antimony trioxide, which is a white inorganic powder, can have an average particle size of about 0.5 to about 2 microns and therefore it can function as a white pigment when added to the ABS resin. Accordingly, it can be difficult to develop color tones, such as primary colors, with an ABS resin that includes antimony trioxide. In addition, the impact resistance or the mechanical strength thereof can deteriorate.

Thus, it is important to minimize adverse effects such as the deterioration of heat stability, physical properties, machinability (workability) and weather stability, while also maintaining excellent flame retardancy when preparing a flame retardant resin.

Korean Patent Application No. 2003-0056039 recites a technology for preparing a flame retardant ABS resin having excellent color tone by combining a bromide bisphenol A epoxy flame retardant and a flame retardant aid such as antimony pentoxide to an ABS thermoplastic resin. Although an ABS resin including antimony pentoxide can have excellent color tone, the flame retardant effect thereof may be somewhat insufficient compared with antimony trioxide, and therefore it can be essential to add an excessive amount of antimony pentoxide to the resin to achieve flame retardancy. Adding too much antimony pentoxide, however, can deteriorate physical properties of the flame retardant resin, such as impact resistance.

SUMMARY OF THE INVENTION

In order to overcome such problems, the present invention is directed to a thermoplastic resin composition in which a (meth)acrylic resin, such as a polymethylmethacrylate (PMMA) resin, is alloyed with a rubber modified aromatic vinyl resin, such as an ABS resin, to improve the color development of the resin. Further, a bromide diphenylethane mixture is added as a flame retardant and a specific amount of antimony oxide can also be added thereto. The resultant thermoplastic resin composition can have excellent flame retardancy and color tone. Since the thermoplastic resin composition of the present invention can have excellent flame retardancy and color tone, it may be employed in production of internal or external parts of electric/electronic goods and office equipment that require both various colors and flame retardancy.

Embodiments of the present invention are therefore directed to a flame-retardant thermoplastic resin composition that can have excellent color tone.

It is a feature of an embodiment of the present invention to provide a thermoplastic resin composition that can also have improved impact resistance and flowability by using a flame retardant agent which has good compatibility with the resin.

It is another feature of an embodiment of the present invention to provide a flame-retardant thermoplastic resin composition which can achieve a flame retardancy rating of V-0 without requiring an excessive amount of a flame retardant agent and/or flame retardant aid.

It is a further feature of an embodiment of the present invention to provide a thermoplastic resin composition which can have improved impact resistance and flame retardancy and thus which may be employed in production of internal or external parts of electric/electronic goods.

In accordance with the present invention, there is provided a flame-retardant thermoplastic resin composition that can have excellent color tone, including a base resin including (A) about 50 to about 99% by weight of a rubber modified aromatic vinyl resin and (B) about 1 to about 50% by weight of a (meth)acrylic resin; (C) about 1 to about 30 parts by weight of a bromodiphenyl ethane mixture, based on about 100 parts by weight of the base resin including (A) and (B), and (D) about 1 to about 10 parts by weight of an antimony oxide, based on about 100 parts by weight of the base resin including (A) and (B).

The bromodiphenyl ethane mixture (C) can includes about 5 to about 85% by weight of hexabromodiphenyl ethane and about 0.01 to about 30% by weight of heptabromodiphenyl ethane, based on the total weight of the bromodiphenyl ethane mixture.

The bromodiphenyl ethane mixture (C) can includes about 55 to about 85% by weight of hexabromodiphenyl ethane and about 1 to about 25% by weight of bromodiphenyl ethane compound having an odd number of bromine substituents, based on the total weight of the bromodiphenyl ethane mixture.

The resin composition may further include one or more bromine-containing flame retardants (E). The total amount of both the bromodiphenyl ethane mixture (C) and the bromine-containing flame retardant (E) can be about 10 to about 30 parts by weight, based on about 100 parts by weight of the base resin including (A) and (B).

The resin composition may further include one or more additives selected from the group consisting of plasticizers, other flame retardants, flame retarding aids, anti-dripping agents, heat stabilizers, parting agents, weather stabilizers, halogen stabilizers, lubricants, inorganic filler, coupling agents, light stabilizers, antioxidants, dyes, pigments, antistatic agents, release agents, dispersants, weather stabilizers, inorganic fibers, and the like, and combinations thereof.

DETAILED DESCRIPTION OF THE INVENTION

The present invention will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention provides a flame-retardant thermoplastic resin composition that can have excellent color tone including a base resin including (A) about 50 to about 99% by weight of a rubber modified aromatic vinyl resin and (B) about 1 to about 50% by weight of a (meth)acrylic resin; (C) about 1 to about 30 parts by weight of a bromodiphenyl ethane mixture, based on about 100 parts by weight of the base resin comprising (A) and (B), and (D) about 1 to about 10 parts by weight of an antimony oxide, based on about 100 parts by weight of the base resin comprising (A) and (B). The resin composition may further include a bromine-containing flame retardant (E).

(A) Rubber Modified Aromatic Vinyl Resin

The rubber modified aromatic vinyl resin according to the present invention can be a polymer in which rubber phase polymers are dispersed in the form of particles in a matrix (continuous phase) including an aromatic vinyl polymer. In exemplary embodiments of the invention, the rubber modified aromatic vinyl resin may be prepared by polymerizing the aromatic vinyl monomers and one or more optional monomers copolymerizable with said aromatic vinyl monomers to a rubbery copolymer. The rubber modified aromatic vinyl resin may be prepared by methods such as emulsion polymerization, suspension polymerization, bulk polymerization, and by extrusion of a graft copolymer resin and a copolymer resin. In bulk polymerization, both the graft copolymer resin and the copolymer resin may be prepared together in one process, rather than being prepared separately. In other polymerizations, the graft copolymer resin and the copolymer resin may be prepared separately. Regardless of the polymerization technique used, the rubber content in the final aromatic vinyl graft copolymer resin (A) can be about 1 to about 30% by weight, for example about 3 to about 20% by weight. When the rubber content of the rubber modified aromatic vinyl resin is less than about 1% by weight, physical properties thereof can deteriorate. Further, when the rubber content of the rubber modified aromatic vinyl resin is more than about 30% by weight, the flame retardancy thereof can deteriorate. The above rubber can have a Z-average rubber particle size of about 0.1 to about 6.0 μm, for example about 0.25 to about 3.5 μm, to have appropriate properties.

Examples of the aromatic vinyl graft copolymer resin (B) according to the present invention include without limitation acrylonitrile-butadiene-styrene (ABS resin), acrylonitrile-ethylene-propylene-rubber-styrene copolymer resin (AES resin), acrylonitrile-acryl rubber-styrene copolymer resin (AAS resin), and the like, and mixtures thereof.

The rubber modified aromatic vinyl resin of the present invention can be prepared by using a graft copolymer resin alone or a graft copolymer resin and a copolymer resin together, depending on the compatibility of each resin used.

(A1) Graft Copolymer Resin

The graft copolymer resin may be prepared by graft-polymerizing rubbery polymer, an aromatic vinyl monomer, a monomer copolymerizable with an aromatic vinyl monomer, and, optionally, another monomer imparting machinability (workability) and/or heat resistance.

Examples of the rubbery polymers may include without limitation diene rubbers such as polybutadiene, poly(styrene-butadiene), and the like; saturated rubbers in which hydrogen is added to said diene rubber; isoprene rubbers; acrylic rubbers such as polybutyl acrylic acid; and terpolymers of ethylene-propylene-diene monomer (EPDM), and the like, and combinations thereof. Diene rubber, for example butadiene rubber, can be used in exemplary embodiments. The content of the rubbery polymer in the graft copolymer resin may be about 5 to about 65% by weight, based on the total weight of the graft copolymer resin (A1). The average size of the rubber particles can range from about 0.1 to about 4 μm taking into account the desired impact strength and appearance of the resin composition.

Examples of the aromatic vinyl monomer may include, but are not limited to, styrene, α-methyl styrene, β-methyl styrene, p-methyl styrene, p-t-butylstyrene, ethylstyrene, vinyl xylene, monochlorostyrene, dichlorostyrene, dibromostyrene, vinyl naphthalene and the like, and combinations thereof. Styrene can be used in exemplary embodiments of the invention. The aromatic vinyl monomer may be used in an amount of about 34 to about 94% by weight based on the total weight of the graft copolymer resin (A1).

Graft copolymer resin (A1) of the present invention may include one or more monomers copolymerizable with an aromatic vinyl monomer. Examples of the monomers copolymerizable with an aromatic vinyl monomer may include, but are not limited to, vinyl cyanide monomers such as acrylonitrile, unsaturated nitrile monomers such as ethacrylonitrile and methacrylonitrile, and the like, and the monomers may be used alone or in combination of two or more. The amount of the monomers copolymerizable with an aromatic vinyl monomer can be about 1 to about 30% by weight, based on the total weight of the graft copolymer resin (A1).

Examples of the monomer imparting machinability (workability) and/or heat resistance may include without limitation acrylic acid, methacrylic acid, maleic anhydride, N-substituted maleimide, and the like, and combinations thereof. The monomer imparting machinability (workability) and/or heat resistance may be used in an amount of about 0 to about 15% by weight, based on the total weight of the graft copolymer resin (B1).

(A2) Copolymer Resin

The copolymer resin (A2) of the present invention may be prepared by copolymerizing the aromatic vinyl monomer, unsaturated nitrile monomer and optionally other monomer(s) imparting machinability (workability) and/or heat resistance described herein with regard to the graft copolymer resin (A1), excluding the rubber component, and the types and amounts of monomers for the copolymer resin (A2) can be readily selected by the skilled artisan based on the amounts of and compatibility with the monomers present in the graft copolymer resin (A1).

Examples of the aromatic vinyl monomer may include, but are not limited to, styrene, α-methyl styrene, p-methyl styrene, p-t-butyl styrene, ethylstyrene, monochlorostyrene, dichlorostyrene, dibromostyrene, and the like, and combinations thereof. Styrene can be used in exemplary embodiments of the invention. The aromatic vinyl monomer can be used in an amount of about 60 to about 95% by weight, based on the total weight of the copolymer resin (A2).

Examples of monomers copolymerizable with the aromatic vinyl monomer may include, but are not limited to, vinyl cyanide monomers such as acrylonitrile, unsaturated nitrile compounds such as ethacrylonitrile and methacrylonitrile, and the like, and the monomers may be used alone or in combination of two or more. The amount of the monomer copolymerizable with the aromatic vinyl monomer can be about 10 to about 40% by weight, based on the total weight of the copolymer resin (A2).

Examples of the monomers imparting machinability (workability) and/or heat resistance may include without limitation acrylic acid, methacrylic acid, maleic anhydride, N-substituted maleimide and the like, and combinations thereof. The amount of the monomers imparting machinability (workability) and/or heat resistance can be about 0 to about 30% by weight, based on the total weight of the copolymer resin (A2).

The rubber modified aromatic vinyl resin (A) according to the present invention can include about 10 to about 100% by weight of the graft copolymer resin (A1) and about 0 to about 90% by weight of the copolymer resin (A2). In exemplary embodiments the rubber modified aromatic vinyl resin (A) can include about 55 to about 90% by weight of the graft copolymer resin (A1) and about 10 to about 45% by weight of the copolymer resin (A2). Another embodiment of the rubber modified aromatic vinyl resin (A) can include about 15 to about 45% by weight of the graft copolymer resin (A1) and about 55 to about 85% by weight of the copolymer resin (A2).

In some embodiments, the rubber modified aromatic vinyl resin (A) may include the graft copolymer resin (A1) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87 88, 89, 90, 91, 92, 93, 94, 95, 96, 97, 98, 99, or 100% by weight. Further, according to some embodiments of the present invention, the amount of the graft copolymer resin (A1) can be in a range from about any of the foregoing amounts to about any other of the foregoing amounts.

In some embodiments, the rubber modified aromatic vinyl resin (A) may not include the copolymer resin (A2) (i.e., the rubber modified aromatic vinyl resin (A) may include 0% by weight of the copolymer resin (A2)). In some embodiments, the copolymer resin (A2) may be present in the rubber modified aromatic vinyl resin (A), i.e., the rubber modified aromatic vinyl resin (A) may include the copolymer resin (A2) in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87 88, 89, or 90% by weight. Further, according to some embodiments of the present invention, the amount of the copolymer resin (A2) can be in a range from about any of the foregoing amounts to about any other of the foregoing amounts The base resin can include the rubber modified aromatic vinyl resin (A) in an amount of about 50 to about 99% by weight, for example about 70 to about 95% by weight, based on the total weight of the base resin. In some embodiments, the base resin may include the rubber modified aromatic vinyl resin (A) in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87 88, 89, 90, 91, 92, 93, 94, 95, 96, 97, 98, or 99% by weight. Further, according to some embodiments of the present invention, the amount of the rubber modified aromatic vinyl resin (A) can be in a range from about any of the foregoing amounts to about any other of the foregoing amounts. Including the rubber modified aromatic vinyl resin (A) in an amount above can provide desired impact resistance and machinability (workability).

(B) (Meth)Acrylic Resin

The (meth)acrylic resin of the thermoplastic resin of the present invention may include a homopolymer consisting of a (meth)acrylic monomer, a copolymer including two or more (meth)acrylic monomers, or a combination of one or more homopolymer(s) and/or one or more copolymer(s). The (meth)acrylic resin (B) can have a weight average molecular weight of about 10,000 to about 300,000. The use of a (meth)acrylic resin (B) with a weight average molecular weight within this range can prevent deterioration of physical properties and reduce interfacial tension. When the weight average molecular weight of the (meth)acrylic resin is less than about 10,000, it can be difficult to obtain impact strength. Further, when the weight average molecular weight of the (meth)acrylic resin is more than about 300,000, it can be difficult to obtain flowability.

As used herein, the term "(meth)acrylic resin" can include either or both methacrylic resins and acrylic resins.

In exemplary embodiments, the (meth)acrylic resin (B) may include one or more homopolymers and/or one or more copolymers including one or more acrylic acid-based monomers and/or methacrylic acid-based monomers, such as but not limited to acrylic acid monomer, methacrylic acid monomer, acrylic acid ester monomers, methacrylic acid ester monomers, and the like, and combinations thereof. In exemplary embodiments, the (meth)acrylic resin (B) may include a methacrylic acid alkyl ester monomer and/or an acrylic acid alkyl ester monomer, such as methacrylic acid methyl ester monomer.

Exemplary (meth)acrylic acid-based monomers may include without limitation methyl methacrylate, ethyl methacrylate, n-propyl methacrylate, phenyl methacrylate, benzyl methacrylate, cyclohexyl methacrylate, phenoxy methacrylate, phenoxy ethyl methacrylate, methyl acrylate, ethyl acrylate, propyl acrylate, phenoxy acrylate, phenoxy ethyl acrylate, and the like. The (meth)acrylic acid-based monomer may be used alone or in combination of two or more.

The (meth)acrylic resin (B) may be prepared using conventional techniques known in the art, such as but not limited to emulsion polymerization, suspension polymerization, bulk polymerization, and the like, and the skilled artisan will readily understand how to make such (meth)acrylic resins.

In addition, the (meth)acrylic resin (B) may be a homopolymer including a single monomer, or a copolymer including two or more (meth)acrylate-based monomers, or a combination or mixture of one or more homopolymers and/or one or more copolymers.

The base resin may include the (meth)acrylic resin (B) in an amount of about 1 to about 50% by weight, for example about 5 to about 30% by weight, based on 100% by weight of the base resin. In some embodiments, the base resin may include the (meth)acrylic resin (B) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the (meth)acrylic resin (B) can be in a range from about any of the foregoing amounts to about any other of the foregoing amounts. When the base resin includes the (meth)acrylic resin in an amount of less than about 1% by weight, it can be difficult to achieve the physical properties of the composition of the invention. Further, when the base resin includes the (meth)acrylic resin in an amount of more than about 50% by weight, it can be difficult to achieve the desired flame retardancy.

(C) Bromodiphenyl Ethane Mixture

One aspect of the present invention relates to a novel bromodiphenyl ethane mixture. The bromodiphenyl ethane mixture is prepared by an addition reaction of bromine with diphenyl ethane. In exemplary embodiments, the bromodiphenyl ethane mixture is obtained by collecting the bromodiphenyl ethane from the reactant produced by adding 5 to 9 Br atoms to diphenyl ethane. The bromodiphenyl ethane mixture (C) can include about 5 to about 85% by weight of hexabromodiphenyl ethane and about 0.01 to about 30% by weight of heptabromodiphenyl ethane, based on the total weight of the bromodiphenyl ethane mixture.

In an exemplary embodiment, the bromodiphenyl ethane mixture may be prepared by injecting bromine into a reactor filled with diphenyl ethane, a solvent and a catalyst and reacting bromine with diphenyl ethane for about 0.5 to about 24 hours while the reactor is maintained at a temperature of about −20 to about 35° C. The catalyst can be a metal such as aluminum or antimony, a bromide metal or a chloride metal, or a combination thereof. Exemplary catalysts include without limitation Al, $AlCl_3$, Sb, $SbCl_3$, $SbCl_5$, $SbBr_3$, $SbClBr_4$, $SbBrCl_4$, Fe, $FeCl_3$, $FeBr_3$, Ti, $TiCl_4$, $TiBr_4$, Sn, $SnCl_2$, $SnBr_3$, $SnCl_4$, $AlBr_3$, Be, $BeCl_2$, Cd, $CdCl_2$, Zn, $ZnCl_2$, B, $BF_4$, $BCl_3$, $BBr_3$, $BiCl_3$, Zr, $ZrCl_4$, and the like, and combinations thereof. The catalyst may be used in an amount of about 0.01 to about 3 moles per 1 mole of diphenyl ethane.

The bromine may be injected into the diphenyl ethane in a ratio range of about 5 to about 9 moles, for example about 6.0 to about 8.0 moles, and as another example about 6.2 to about 7.0 moles, per mole of diphenyl ethane, to thereby substitute about 5.5 to about 8.5 hydrogens within the diphenyl ethane.

In an exemplary embodiment, the bromodiphenyl ethane mixture may be a mixture of hexabromodiphenyl ethane, heptabromodiphenyl ethane, and octabromodiphenyl ethane or a mixture of tetrabromodiphenyl ethane, pentabromodiphenyl ethane and hexabromodiphenyl ethane.

In another embodiment, the bromodiphenyl ethane mixture may further include pentabromodiphenyl ethane, octabromodiphenyl ethane, nonabromodiphenyl ethane, decabromodiphenyl ethane and low molecular weight hydrocarbons. The low molecular weight hydrocarbons may include monobromodiphenyl ethane, dibromodiphenyl ethane, tribromodiphenyl ethane or tetrabromodiphenyl ethane, and the like, and combinations thereof.

In an exemplary embodiment based on an area ratio in a GC/MS (Gas Chromatography/Mass Spectrometry) analysis, the bromodiphenyl ethane mixture may comprise about 0.01 to about 20% by weight of heptabromodiphenyl ethane, for example about 0.01 to about 15% by weight, and may comprise about 5 to about 85% by weight of hexabromodiphenyl ethane, for example about 55 to about 85% by weight, and as another example about 60 to about 85% by weight.

In another exemplary embodiment, the bromodiphenyl ethane mixture (C) may comprise about 55 to about 85% by weight of hexabromodiphenyl ethane, and bromine-substituted compound(s) having an odd number of bromine substituents (also referred to as an odd numbered bromodiphenyl ethane) in an amount of about 1 to about 25% by weight, based on the total weight of the bromodiphenyl ethane mixture. Examples of the bromine-substituted compound having an odd number of bromine substituents may include without limitation pentabromodiphenyl ethane, heptabromodiphenyl ethane, nonabromodiphenyl ethane, and combinations thereof.

In an exemplary embodiment based on an area ratio in a GC/MS (Gas Chromatography/Mass Spectrometry) analysis, the bromodiphenyl ethane mixture may comprise about 0 to about 2% by weight of pentabromodiphenyl ethane, about 55 to about 85% by weight of hexabromodiphenyl ethane, about 1 to about 20% by weight of heptabromodiphenyl ethane, about 1 to about 25% by weight of octabromodiphenyl ethane, about 0 to about 10% by weight of nonabromodiphenyl ethane, and about 0 to about 5% by weight of decabromodephenyl ethane.

In another exemplary embodiment, the bromodiphenyl ethane mixture may comprise about 5 to about 15% by weight of pentabromodiphenyl ethane, about 72 to about 85% by weight of hexabromodiphenyl ethane, about 2 to about 10% by weight of heptabromodiphenyl ethane, and about 0.1 to about 3% by weight of octabromodiphenyl ethane.

In another exemplary embodiment, the bromodiphenyl ethane mixture may comprise about 55 to about 75% by weight of hexabromodiphenyl ethane, about 11 to about 16% by weight of heptabromodiphenyl ethane, about 10 to about 20% by weight of octabromodiphenyl ethane, and about 1 to about 9% by weight of nonabromodiphenyl ethane.

In another exemplary embodiment, the bromodiphenyl ethane mixture may comprise about 0.1 to about 3% by weight of pentabromodiphenyl ethane, about 55 to about 83% by weight of hexabromodiphenyl ethane, about 7 to about 15% by weight of heptabromodiphenyl ethane, about 5 to about 20% by weight of octabromodiphenyl ethane, and about 1 to about 7% by weight of nonabromodiphenyl.

In another exemplary embodiment, the bromodiphenyl ethane mixture may comprise about 0.1 to about 3% by weight of pentabromodiphenyl ethane, about 55 to about 83% by weight of hexabromodiphenyl ethane, about 7 to about 15% by weight of heptabromodiphenyl ethane, about 5 to about 20% by weight of octabromodiphenyl ethane, about 1 to about 7% by weight of nonabromodiphenyl, and about 0.01 to about 1% by weight of decabromodiphenyl In an exemplary embodiment, the bromodiphenyl ethane mixture may comprise about 55 to about 83% by weight of hexabromodiphenyl ethane, about 7 to about 17% by weight of heptabromodiphenyl ethane, about 5 to about 23% by weight of octabromodiphenyl ethane, about 1 to about 7% by weight of nonabromodiphenyl, and about 0.01 to about 1% by weight of decabromodiphenyl.

In the present invention, the thermoplastic resin composition can include the bromodiphenyl ethane mixture (C) in an amount of about 0.5 to about 30 parts by weight, for example about 5 to about 25 parts by weight, and as another example about 10 to about 20 parts by weight, based on about 100 parts by weight of the base resin. In some embodiments, the thermoplastic resin composition may include the bromodiphenyl ethane mixture (C) in an amount of about 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight. Further, according to some embodiments of the present invention, the amount of the bromodiphenyl ethane mixture (C) can be in a range from about any of the foregoing amounts to about any other of the foregoing amounts. If the amount of the bromodiphenyl ethane mixture is less than about 0.5 weight parts, it can be difficult to improve flame retardancy.

When the amount of the bromodiphenyl ethane mixture exceeds about 30 weight parts, there can be a problem of low flowability.

(D) Antimony Oxide

The flame retardant aid of the present invention contains antimony. In exemplary embodiments of the invention, the flame retardant aid is antimony oxide. Examples of the antimony oxide may include without limitation antimony trioxide, antimony pentoxide and combinations thereof. In exemplary embodiments, the flame retardant aid is antimony trioxide.

When the flame retardant aid includes antimony trioxide, at least 50% of the antimony trioxide particles can have a size of about 0.01 to about 6 μm, for example about 0.02 to about 3.0 μm.

When the flame retardant aid includes antimony pentoxide, at least 50% of the antimony pentoxide particles can have a size of about 0.01 to about 1.0 μm, for example about 0.02 to about 0.5 μm.

The thermoplastic resin composition may include the antimony oxide (D) in an amount of about 1 to about 10 parts by weight, for example about 1 to about 7 parts by weight, and as another example about 2 to about 5 parts by weight, per 100 parts by weight of the base resin. In some embodiments, the thermoplastic resin composition may include the antimony oxide (D) in an amount of about 1, 2, 3, 4, 5, 6, 7, 8, 9, or 10 parts by weight. Further, according to some embodiments of the present invention, the amount of the antimony oxide (D) can be in a range from about any of the foregoing amounts to about any other of the foregoing amounts.

If the antimony oxide is used in an amount less than about 1 part by weight, it can be difficult to provide improved flame retardancy. If the antimony oxide is used in an amount greater than about 1 part by weight, it can be difficult to maintain a desired balance of physical properties of the resin.

(E) Bromine-Containing Flame Retardant

The present invention optionally can further include a bromine-containing flame retardant (E). Exemplary bromine-containing flame retardants (E) may include without limitation tetrabromobisphenol A, decabromodiphenyl oxide, decabrominateddiphenyl ethane, 1,2-bis(tribromophenyl) ethane, brominated epoxy oligomers with a molecular weight of about 600 to about 8000, octabromotrimethylphenylindane, bis(2,3-dibromopropyl ether), tris(tribromophenyl)triazine, brominated aliphatic and aromatic hydrocarbons, and the like, and combinations thereof.

When a bromine-containing flame retardant (E) is present, the amount of a mixture of the bromodiphenyl ethane mixture (C) and the bromine-containing flame retardant (E) can be about 10 to about 30 parts by weight, for example about 12 to about 20 parts by weight, based on about 100 parts by weight of a base resin including (A) and (B). If the amount of the mixture is used within the above range, the resin composition obtained therefrom may have high impact strength and flowability.

Other additives may be included in the resin composition of the present invention. Examples of such additives further include without limitation plasticizers, flame retardants (such as halogen-based flame retardants, including bromine-based flame retardants, other than the halogen flame retardants (B) and (E) described herein; phosphorous-based flame retardants; and the like; and combinations thereof), anti-dripping agents, heat stabilizers, parting agents, weather stabilizers, halogen stabilizers, lubricants, inorganic fillers, coupling agents, light stabilizers, antioxidants, dyes, pigments, anti-static agents, release agents, dispersants, weather stabilizers, inorganic fibers, and the like and combination thereof. The additive(s) may be used in conventional amounts, for example less than about 50 parts by weight, and as another example about 10 to about 30 parts by weight, per 100 parts by weight of the base resin including (A) and (B).

The resin composition according to the present invention can be prepared by a conventional process. For example, the resin composition of the present invention may be manufactured into the form of pellets by mixing the foregoing components and optionally one or more additives and then melting and extruding the mixture in an extruder. The manufactured pellets may be manufactured into various molded articles using known molding methods, such as injection molding, extrusion molding, vacuum molding, and casting molding.

The resin composition of the present invention can have excellent impact resistance compared with conventional flame retardant resins, and can be molded into various products. The resin composition of the invention can be particularly suitable for the production of electric or electronic housings, computer or office equipment housings, structural materials and the like.

According to another aspect of the present invention, there is provided a molded article obtained by molding the resin composition. The molded article can have excellent impact resistance, fluidity, flame retardancy, and the like, and can be used in a wide variety of products, such as but not limited to components of electric and electronic appliances, exterior materials, car components, miscellaneous goods, structural materials, and the like.

The invention may be better understood by reference to the following examples which are intended for the purpose of illustration and are not to be construed as in any way limiting the scope of the present invention, which is defined in the claims appended hereto.

EXAMPLE (A) Rubber Modified Aromatic Vinyl Resin

An ABS resin (produced by Cheil Industries Inc.) is used, which is prepared by mixing an ABS resin (PBD content: 58%), prepared by polymerizing rubber having an average rubber particle diameter of 0.32 μm, and SAN (styrene-acrylonitrile) resin having an average molecular weight of about 120,000 and comprising about 28% by weight of acrylonitrile and 72% by weight of styrene.

(B) (Meth)acrylic Resin

Polymethylmethacrylate (PMMA) resin with an average molecular weight of about 30,000 is used (produced by Cheil Industries Inc.).

(C) Bromodiphenyl Ethane Mixtures

Bromine is injected into diphenyl ethane mixtures so that about 5 to about 8.5 hydrogens are substituted with bromine within the diphenyl ethane. Analyses of the synthesized bromodiphenyl ethane mixtures are performed using a GC/MS after diluting given samples to a dilution factor of 2000 (0.5 mg/mL) with toluene to thereby completely dissolve the samples. After diluting given samples, a 1 mL volume of diluted sample is injected into the GC vial. Agilent 7683 injector, Agilent 7890N Gas Chromatography, and Agilent 5975C Mass Spectroscopy Detector are used as measuring instruments. Measuring conditions are as follows: an inlet temperature is 320° C., a split ratio is splitless, a column is UA-1 or DB-5HT, a column flow rate is 1.0 ml/min, an oven temperature program is 40° C. (2 min)-40° C./min→200° C.-10° C./min→260° C.-20° C./min→340° C. (2 min) and an MS interface temperature is 280° C. The qualitative analysis is conducted by injecting a 1 μl sample into a GC/MSD using an auto-sampler. The respective measured compositions are used based on the area. The Br content analysis is carried out using an IC. Br contents of the samples are measured by drawing up calibration curves using an IC-500 after injecting an excessive amount of oxygen into the sample and burning the samples using the injected excess of oxygen. Compositions of the prepared bromodiphenyl ethane mixtures are represented in the following table.

TABLE 1

| Comp. | Area ratio (%) | | | | | | | | |
|---|---|---|---|---|---|---|---|---|---|
| | C1 | C2 | C3 | C4 | C5 | C6 | C7 | C8 | C9 |
| E-quivalent of Br | 5 | 6 | 6.4 | 6.75 | 7 | 7.35 | 7.7 | 8 | 8.5 |
| Br4 | 18.9 | — | — | — | — | 1.5 | — | — | — |
| Br5 | 64.7 | 13.6 | 1.6 | 1.4 | 0.9 | 1.9 | — | — | — |
| Br6 | 16.4 | 79.9 | 83.0 | 77.6 | 71.2 | 65.7 | 57.4 | 35.4 | 16.0 |
| Br7 | — | 6.2 | 13.5 | 13.4 | 13.8 | 12.8 | 15.0 | 16.1 | 17.1 |
| Br8 | — | 0.3 | 1.9 | 6.6 | 10.7 | 13.5 | 18.2 | 30.6 | 41.0 |
| Br9 | — | — | — | 1.0 | 3.4 | 4.5 | 8.8 | 16.8 | 24.3 |
| Br10 | — | — | — | — | — | 0.1 | 0.6 | 1.1 | 1.6 |

(D) Antimony oxide.

(D1) Antimony trioxide [ANTIS-W] produced by Korean Ilsung Antimon Corporation is used.

(D2) Antimony pentoxide produced by American NYA-COL Corporation is used.

(E) Bromine-Based Flame Retardant

SAYTEX 4010 (Decabromodiphenyl ethane) produced by Albemarle Corporation is used.

The invention will be more readily understood by reference to the following exemplary embodiments which have been set forth solely for purposes of exposition and which are not intended to limit the scope of the invention.

Examples 1-5

Each of the components are added in the amount represented in the following Table 2, and about 0.3 parts by weight of hindered phenol antioxidant Irganox1076 (Songwon Industrial Co., Ltd., Korea) as an antioxidant, 0.4 parts by weight of SONGSTAB Ca-St (Songwon Industrial Co., Ltd., Korea) as a stearate metallic soap, and 0.5 parts by weight of wax are added. The added components are uniformly mixed with each other and then extruded through a twin-screw extruder so as to prepare pellets. After drying the produced pellets at 100° C. for 4 hours, the pellets are molded into test specimens using a 6-oz injector under conditions of a barrel temperature of 230 to 250° C. and with a mold temperature of 70 to 90° C.

The flame retardancy of the test specimens is measured according to UL 94 VB at a specimen thickness of $^{1}/_{12}$". The Izod impact strength (kgf cm/cm) is measured in accordance with ASTM 256 ($^{1}/_{8}$ inch, notched). The flowability (Melt Flow Index, g/10 min) is measured in accordance with ASTM D-1238 (220° C./5 kg). The color development is evaluated by measuring in comparison the L-value representing the brightness through a colorimeter, after 1 part by weight of a black colorant is added to the resin and the resin is extruded. The results are shown in Tables 2.

Comparative Examples 1-4

Comparative Examples 1-4 are prepared by the same method as in the foregoing Examples 1 and 4 except that the bromine-containing flame retardant (D) is used as a flame retardant.

Comparative Example 5

Comparative Examples 5 is prepared by the same method as in the foregoing Examples 1 to 4 except that ABS is used as a base resin.

TABLE 2

| | | Examples | | | | | Comparative Examples | | | | |
|---|---|---|---|---|---|---|---|---|---|---|---|
| | | 1 | 2 | 3 | 4 | 5 | 1 | 2 | 3 | 4 | 5 |
| Parts by weight | (A) | 95 | 90 | 80 | 80 | 80 | 90 | 80 | 100 | 100 | 100 |
| | (B) | 5 | 10 | 20 | 20 | 20 | 10 | 20 | — | — | — |
| | (C) | 18 | 18 | 18 | 18 | 16 | — | — | — | — | 18 |
| | (D1) | 4 | 4 | 4 | — | — | 4 | 4 | 4 | — | 4 |
| | (D2) | — | — | — | 4 | 4 | — | — | — | 4 | — |
| | (E) | — | — | — | — | 4 | 18 | 18 | 18 | 18 | — |
| Impact strength | | 10.1 | 9.5 | 8.7 | 9.1 | 8.4 | 6.5 | 6.3 | 6.8 | 6.8 | 10.3 |
| Flowability | | 5 | 5.5 | 5.8 | 6.1 | 6.3 | 3.5 | 3.8 | 3.0 | 3.9 | 4.5 |
| Color Development | | 27.9 | 27.6 | 27.3 | 27.0 | 27.7 | 29.1 | 28.8 | 29.8 | 29.2 | 29.3 |
| Flame retardancy | | V-0 | V-0 | V-0 | V-0 | V-0 | V-0 | V-0 | V-0 | V-0 | V-0 |

As represented in Table 2, the examples of the invention include compositions in which a bromodiphenyl ethane mixture is added to a resin prepared by alloying acrylonitrile-butadiene-styrene copolymer and polymethylmethacrylate. The examples of the invention show remarkably improved flame retardancy and maintain excellent color development as compared with Comparative Examples using the same amount of a bromine-containing flame retardant. Moreover, the examples of the invention show remarkably improved impact strength and maintain excellent flowability.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A flame-retardant thermoplastic resin composition having excellent color tone comprising:
   a base resin comprising (A) about 50 to about 99% by weight of a rubber modified aromatic vinyl resin; and (B) about 1 to about 50% by weight of a (meth)acrylic resin;
   (C) about 1 to about 30 parts by weight of a bromodiphenyl ethane mixture comprising about 0 to about 2% by weight of pentabromodiphenyl ethane, about 55 to about 85% by weight of hexabromodiphenyl ethane, about 1 to about 20% by weight of heptabromodiphenyl ethane, about 1 to about 25% by weight of octabromodiphenyl ethane, about 0 to about 10% by weight of nonabromodiphenyl ethane and about 0 to about 5% by weight of decabromodiphenyl ethane, based on about 100 parts by weight of a base resin comprising (A) and (B); and
   (D) about 1 to about 10 parts by weight of an antimony oxide, based on about 100 parts by weight of a base resin comprising (A) and (B).

2. The flame-retardant thermoplastic resin composition having excellent color tone of claim 1, wherein said rubber modified aromatic vinyl resin (A) comprises:
   (A1) about 10 to about 100% by weight of a grafted copolymer resin prepared by graft-polymerizing about 4 to about 65% by weight of a rubbery polymer, about 30 to about 95% by weight of an aromatic vinyl monomer and about 1 to about 20% by weight of a monomer copolymerizable with said aromatic vinyl monomer; and
   (A2) about 0 to about 90% by weight of a copolymer resin prepared by polymerizing about 60 to about 90% by weight of an aromatic vinyl monomer, about 10 to about 40% by weight of a monomer copolymerizable with said aromatic vinyl monomer and about 0 to about 30% by weight of a monomer for workability, heat resistance, or both.

3. The flame-retardant thermoplastic resin composition having excellent color tone of claim 1, wherein said (meth)acrylic resin (B) comprises a homopolymer, a copolymer, or a combination thereof, comprising an acrylic acid monomer, a methacrylic acid monomer, an acrylic acid ester monomer, a methacrylic acid ester monomer, or a combination thereof.

4. The flame-retardant thermoplastic resin composition having excellent color tone of claim 3, wherein said (meth)acrylic resin (B) comprises a homopolymer, a copolymer, or a combination thereof, comprising an acrylic acid alkyl ester monomer, a methacrylic acid alkyl ester monomer, or a combination thereof.

5. The flame-retardant thermoplastic resin composition having excellent color tone of claim 4, wherein said (meth)acrylic resin (B) comprises polymethylmethacrylate.

6. The flame-retardant thermoplastic resin composition having excellent color tone of claim 1, wherein said (meth)acrylic resin (B) has a weight average molecular weight of about 10,000 to about 300,000.

7. The flame-retardant thermoplastic resin composition having excellent color tone of claim 1, wherein said bromodiphenyl ethane mixture (C) comprises about 55 to about 85% by weight of hexabromodiphenyl ethane and about 1 to about 25% by weight of bromodiphenyl ethane compound having an odd number of bromine substituents, based on the total weight of the bromodiphenyl ethane mixture.

8. The flame-retardant thermoplastic resin composition having excellent color tone of claim 1, wherein said bromodiphenyl ethane mixture (C) comprises about 55 to about 75% by weight of hexabromodiphenyl ethane, about 11 to about 16% by weight of heptabromodiphenyl ethane, about 10 to about 20% by weight of octabromodiphenyl ethane and about 1 to about 9% by weight of nonabromodiphenyl ethane.

9. The flame-retardant thermoplastic resin composition having excellent color tone of claim 1, wherein said bromodiphenyl ethane mixture (C) comprises about 55 to 83% by weight of hexabromodiphenyl ethane, about 7 to about 17% by weight of heptabromodiphenyl ethane, about 5 to about 23% by weight of octabromodiphenyl ethane, about 1 to about 7% by weight of nonabromodiphenyl ethane and about 0.01 to about 1% by weight of decabromodiphenyl ethane.

10. The flame-retardant thermoplastic resin composition having excellent color tone of claim 1, wherein resin composition further comprises one or more bromine-containing flame retardants (E) comprising tetrabromobisphenol A, decabromodiphenyloxide, decabromodiphenyl ethane, 1,2-bis(tribromophenyl)ethane, brominated epoxy oligomer having a weight average molecular weight of about 600 to about 8,000 g/mol, octabromotrimethylphenylindane, bis(2,3-dibromopropyl ether), tris(tribromophenyl)triazine, brominated aliphatic or aromatic hydrocarbon, or a combination thereof.

11. The flame-retardant thermoplastic resin composition having excellent color tone of claim 10, wherein the amount of said bromodiphenyl ethane mixture (C) and said bromine-containing flame retardant (E) is about 10 to about 30 parts by weight, based on about 100 parts by weight of the base resin comprising (A) and (B).

12. The flame-retardant thermoplastic resin composition having excellent color tone of claim 1, wherein said resin composition further comprises one or more additives selected from the group consisting of plasticizers, flame retardants, flame retarding aids, anti-dripping agents, heat stabilizers, parting agents, weather stabilizers, halogen stabilizers, lubricants, inorganic fillers, coupling agents, light stabilizers, antioxidants, dyes, pigments, antistatic agents, release agents, dispersants, weather stabilizers, inorganic fibers and combinations thereof.

13. An article comprising a flame-retardant thermoplastic resin composition of claim 1.

* * * * *